US012647532B2

(12) United States Patent
Giovanardi et al.

(10) Patent No.: US 12,647,532 B2
(45) Date of Patent: Jun. 2, 2026

(54) ONLINE MEETING SUMMARIZATION FOR VIDEOCONFERENCING

(71) Applicant: Zoom Video Communications, Inc., San Jose, CA (US)

(72) Inventors: Davide Giovanardi, San Jose, CA (US); Bilung Lee, Irvine, CA (US); Felix Schneider, Baden-Wurttemberg (DE); Marco Turchi, Trento (IT); Alexander Waibel, Sammamish, WA (US); Yun Zhang, Pittsburgh, PA (US)

(73) Assignee: Zoom Communications, Inc., San Jose, CA (US)

( * ) Notice: Subject to any disclaimer, the term of this patent is extended or adjusted under 35 U.S.C. 154(b) by 69 days.

(21) Appl. No.: 18/441,548

(22) Filed: Feb. 14, 2024

(65) Prior Publication Data

US 2025/0260790 A1 Aug. 14, 2025

(51) Int. Cl.
*H04N 7/15* (2006.01)

(52) U.S. Cl.
CPC ............. *H04N 7/155* (2013.01); *H04N 7/152* (2013.01)

(58) Field of Classification Search
CPC ........ H04N 7/155; H04N 7/152; H04N 7/147; G06F 16/345; G06Q 10/1091; G06Q 50/01; G06Q 10/10; G11B 27/031
See application file for complete search history.

(56) References Cited

U.S. PATENT DOCUMENTS

| | | | |
|---|---|---|---|
| 2022/0353470 A1 | 11/2022 | Huang et al. | |
| 2023/0096782 A1 | 3/2023 | Crumley et al. | |
| 2023/0153530 A1* | 5/2023 | Savkov ................. | G06N 3/084 |
| | | | 704/9 |
| 2024/0086461 A1* | 3/2024 | Varakin ................. | G06F 40/35 |
| 2024/0176960 A1* | 5/2024 | Maurer ................. | G06F 16/345 |
| 2024/0340193 A1* | 10/2024 | Zhu ......................... | G06F 40/30 |
| 2025/0005289 A1* | 1/2025 | Wang .................... | G06F 16/345 |

(Continued)

OTHER PUBLICATIONS

"GPT-4 Technical Report", Available online at: https://cdn.openai.com/papers/gpt-4.pdf, Dec. 19, 2023, pp. 1-100.

(Continued)

*Primary Examiner* — Stella L. Woo
(74) *Attorney, Agent, or Firm* — Kilpatrick Townsend & Stockton LLP

(57) ABSTRACT

Systems and methods for generating online meeting summaries for videoconferencing are provided. For example, a computing device establishes a video conference for a plurality of participants. While the video conference is in progress, the computing device receives a first portion of a transcript of the video conference and generates a first meeting summary based on the first portion of the transcript. The computing device causes the first meeting summary to be presented in a user interface accessible by a client computing device associated with at least one of the plurality of participants. The computing device receives a second portion of the transcript of the video conference and generates a second meeting summary based on the first portion and the second portion of the transcript. The computing device causes the second meeting summary to be presented in the user interface.

17 Claims, 11 Drawing Sheets

(56) References Cited

U.S. PATENT DOCUMENTS

| | | | |
|---|---|---|---|
| 2025/0140246 A1* | 5/2025 | Lee | H04L 65/1089 |
| 2025/0232141 A1* | 7/2025 | Bahirwani | G10L 15/26 |

OTHER PUBLICATIONS

Arivazhagan, et al., "Re-Translation Strategies for Long Form, Simultaneous, Spoken Language Translation", Institute of Electrical and Electronics Engineers International Conference on Acoustics, Speech and Signal Processing, Apr. 7, 2020, 5 pages.

Asi, et al., "An End-to-End Dialogue Summarization System for Sales Calls", North American Chapter of the Association for Computational Linguistics, Available online at: https://aclanthology.org/2022.naacl-industry.6.pdf, Apr. 28, 2022, 9 pages.

Fabbri, et al., "ConvoSumm: Conversation Summarization Benchmark and Improved Abstractive Summarization with Argument Mining", Association for Computational Linguistics, vol. 1, Jun. 1, 2021, 15 pages.

Fabbri, et al., "SummEval: Re-evaluating Summarization Evaluation", Transactions of the Association for Computational Linguistics, vol. 9, Apr. 26, 2021, pp. 391-409.

Garg, et al., "Clusterrank: A Graph Based Method for Meeting Summarization", IDIAP Research Report, Jun. 2009, 6 pages.

Ghosal, et al., "Overview of the Second Shared Task on Automatic Minuting (AutoMin) at INLG 2023", Proceedings of the 16th International Natural Language Generation Conference: Generation Challenges, Available online at: https://aclanthology.org/2023.inlg-genchal.19.pdf, Sep. 11-15, 2023, pp. 138-167.

Gliwa, et al., "SAMSum Corpus: A Human-annotated Dialogue Dataset for Abstractive Summarization", Association for Computational Linguistics, Proceedings of the 2nd Workshop on New Frontiers in Summarization, Nov. 29, 2019, 10 pages.

Janin, et al., "The ICSI Meeting Corpus", Available online at: https://www1.icsi.berkeley.edu/ftp/global/pub/speech/papers/icassp03-janin.pdf, Apr. 6-10, 2003, 4 pages.

Lewis, et al., "BART: Denoising Sequence-to-Sequence Pre-training for Natural Language Generation, Translation, and Comprehension", Annual Meeting of the Association for Computational Linguistics, Oct. 29, 2019, 10 pages.

Lin, "ROUGE: A Package for Automatic Evaluation of Summaries", Text Summarization Branches Out, Association for Computational Linguistics, Jul. 25, 2004, 8 pages.

Ma, et al., "SIMULEVAL: An Evaluation Toolkit for Simultaneous Translation", Conference on Empirical Methods in Natural Language Processing, Jul. 31, 2020, 7 pages.

Murray, et al., "Generating and Validating Abstracts of Meeting Conversations: a User Study", Proceedings of the 6th International Natural Language Generation Conference, Jun. 2010, 9 pages.

Nedoluzhko, et al., "ELITR Minuting Corpus: A Novel Dataset for Automatic Minuting from Multi-Party Meetings in English and Czech", Proceedings of the 13th Conference on Language Resources and Evaluation (LREC 2022), Jun. 20-25, 2022, pp. 3174-3182.

Niehues, et al., "Low-Latency Neural Speech Translation", Available online at: https://www.researchgate.net/publication/326799383_Low-Latency_Neural_Speech_Translation, Aug. 1, 2018, 5 pages.

Olariu, "Efficient Online Summarization of Microblogging Streams", Proceedings of the 14th Conference of the European Chapter of the Association for Computational Linguistics, Apr. 26-30, 2014, pp. 236-240.

Papi, et al., "Over-Generation Cannot Be Rewarded: Length-Adaptive Average Lagging for Simultaneous Speech Translation", Proceedings of the Third Workshop on Automatic Simultaneous Translation, Jun. 20, 2022, 6 pages.

Pham, et al., "Select, Prompt, Filter: Distilling Large Language Models for Summarizing Conversations", Proceedings of the 2023 Conference on Empirical Methods in Natural Language Processing, Dec. 6-10, 2023, pp. 12257-12265.

Schneider, et al., "Team Zoom@ AutoMin 2023: Utilizing Topic Segmentation and LLM Data Augmentation for Long-Form Meeting Summarization", Proceedings of the 16th International Natural Language Generation Conference: Generation Challenges, Sep. 11-15, 2023, pp. 101-107.

Sequiera, et al., "Overview of the TREC 2018 Real-Time Summarization Track", Available online at: https://cs.uwaterloo.ca/~jimmylin/publications/Sequiera_etal_TREC2018.pdf, 2018, 5 pages.

Tixier, et al., "Combining Graph Degeneracy and Submodularity for Unsupervised Extractive Summarization", Proceedings of the Workshop on New Frontiers in Summarization, Sep. 7, 2017, pp. 48-58.

Tur, et al., "The Calo Meeting Speech Recognition and Understanding System", Conference: Spoken Language Technology Workshop, Dec. 2008, pp. 69-72.

Vaswani, et al., "Attention Is All You Need", 31st Conference on Neural Information Processing Systems (NIPS 2017), Jun. 2017, 11 pages.

Waibel, et al., "Meeting Browser: Tracking and Summarizing Meetings", Available online at: https://isl.anthropomatik.kit.edu/downloads/_TRACKING.pdf, Aug. 2000, 6 pages.

Zechner, "Automatic Summarization of Open-Domain Multiparty Dialogues Diverse Genres", Association for Computational Linguistics, vol. 28, No. 4, Dec. 1, 2002, pp. 447-485.

Zhang, et al., "SummN: A Multi-Stage Summarization Framework for Long Input Dialogues and Documents", Proceedings of the 60th Annual Meeting of the Association for Computational Linguistics, vol. 1, Apr. 13, 2022, 13 pages.

Zhong, et al., "DIALOGLM: Pre-trained Model for Long Dialogue Understanding and Summarization", The Thirty-Sixth AAAI Conference on Artificial Intelligence, vol. 44, No. 4, Sep. 6, 2021, pp. 11765-11773.

Zhong, et al., "Extractive Summarization as Text Matching", Proceedings of the 58th Annual Meeting of the Association for Computational Linguistics, Apr. 19, 2020, 12 pages.

Zhong, et al., "QMSum: A New Benchmark for Query-based Multi-domain Meeting Summarization", North American Chapter of the Association for Computational Linguistics, Apr. 13, 2021, 17 pages.

Zhou, et al., "Hierarchical Recurrent Aggregative Generation for Few-Shot NLG", Findings of the Association for Computational Linguistics, May 22-27, 2022, pp. 2167-2181.

Zhu, et al., "A Hierarchical Network for Abstractive Meeting Summarization with Cross-Domain Pre training", Findings of the Association for Computational Linguistics: EMNLP 2020, Sep. 20, 2020, 14 pages.

McCowan, et al., "The AMI meeting corpus", Int'l. Conf. on Methods and Techniques in Behavioral Research, 2005, 4 pages.

International Search Report and Written Opinion for PCT/US2025/013733 mailed Apr. 14, 2025.

\* cited by examiner

MODEL OUTPUT
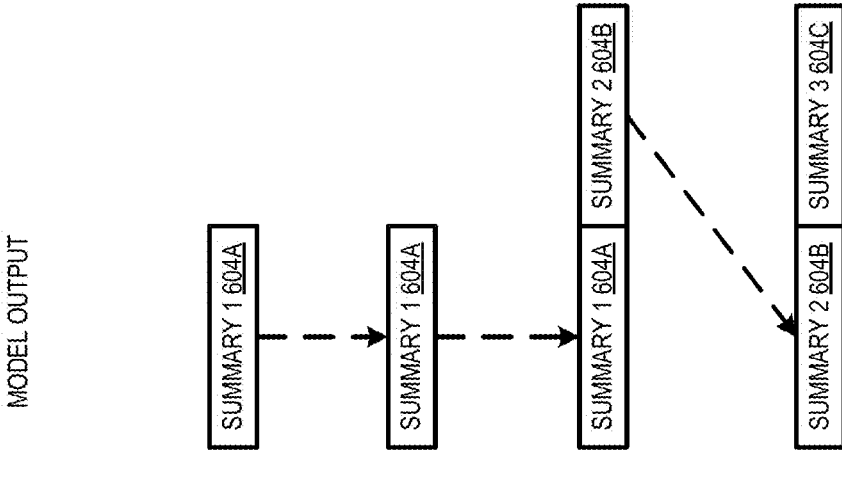
MODEL INPUT
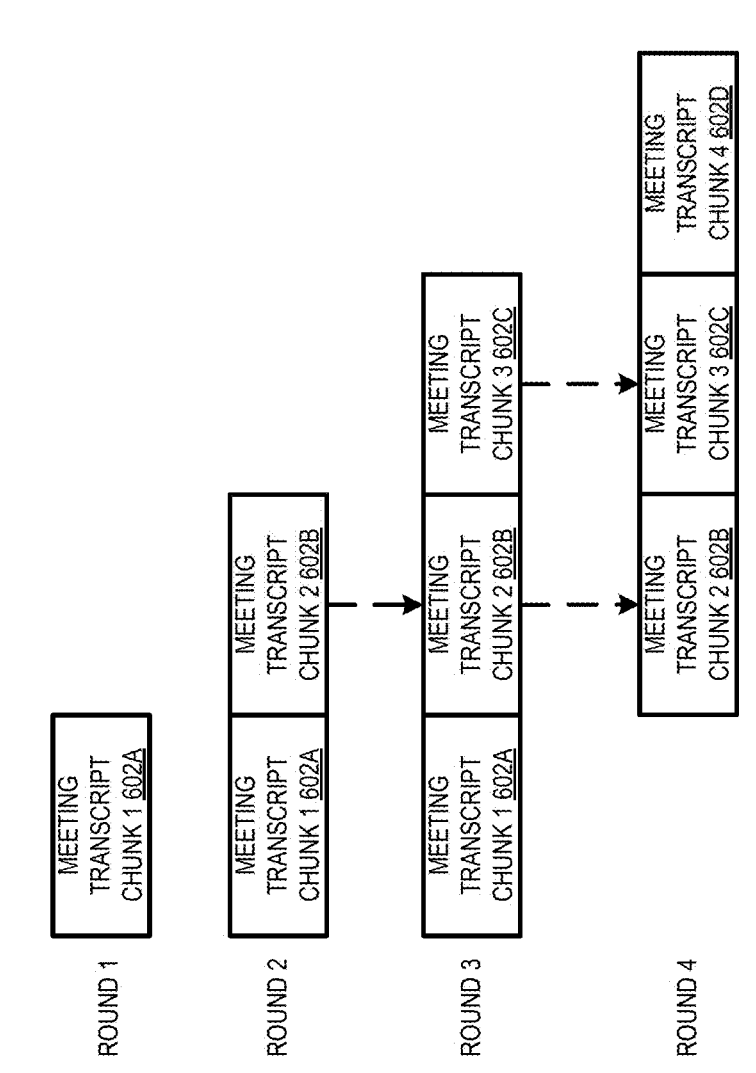
*FIG. 6*

700

ESTABLISH A VIDEO CONFERENCE 702

OBTAIN A NEXT PORTION OF MEETING TRANSCRIPTS 704

GENERATE A MEETING SUMMARY 706

CAUSE THE MEETING SUMMARY TO BE PRESENTED IN A USER INTERFACE 708

VIDEO CONFERENCE OVER? 710

NO

YES

END

800

PUT THE RECEIVED PORTION OF MEETING TRANSCRIPTS IN A BUFFER IN CHUNKS 802

GENERATE CANDIDATE MEETING SUMMARIES USING THE CHUNKS IN THE BUFFER 804

SELECT A CANDIDATE MEETING SUMMARY AS THE MEETING SUMMARY FOR OUTPUT 806

UPDATE THE BUFFER 808

END

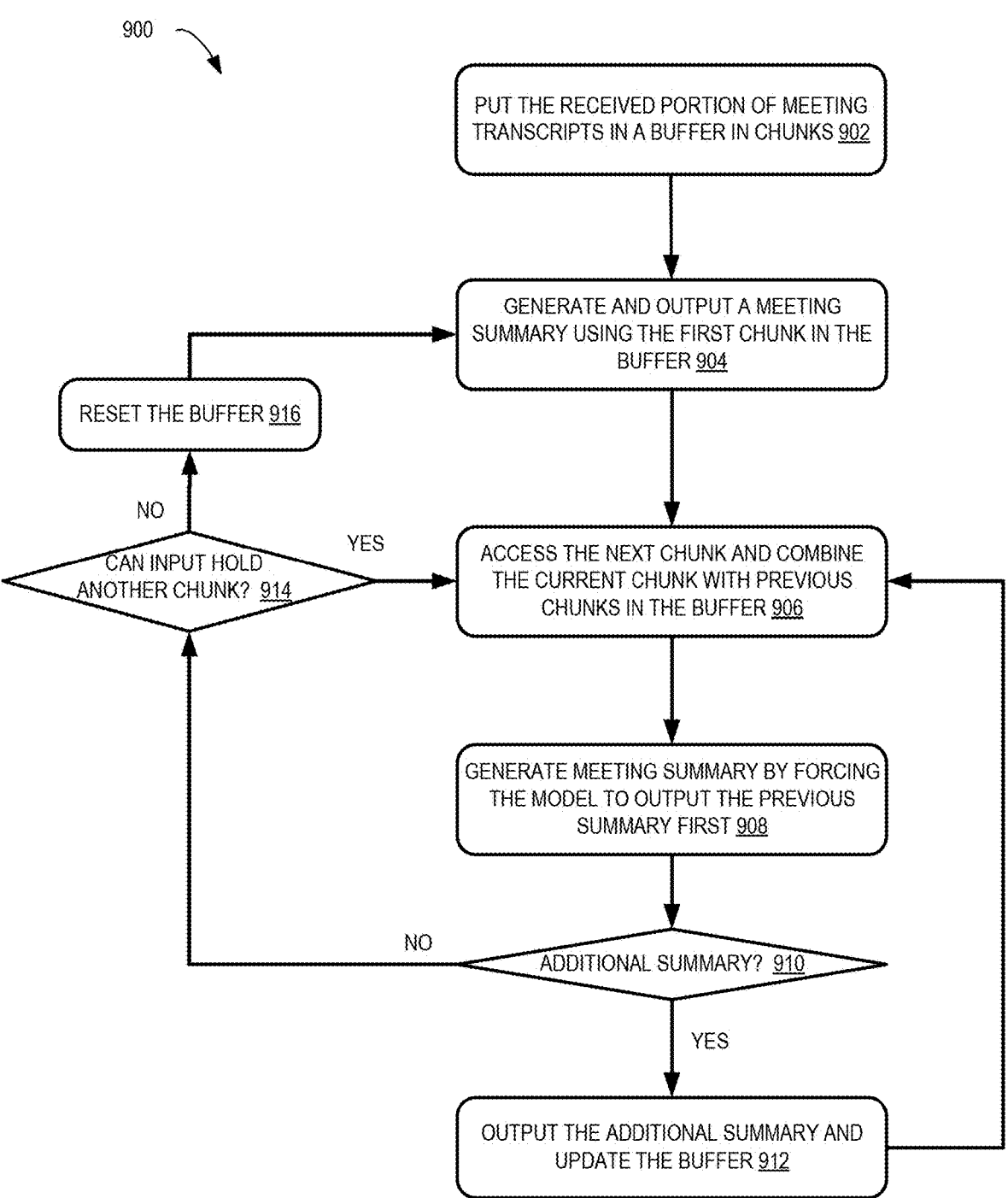

900

PUT THE RECEIVED PORTION OF MEETING TRANSCRIPTS IN A BUFFER IN CHUNKS 902

GENERATE AND OUTPUT A MEETING SUMMARY USING THE FIRST CHUNK IN THE BUFFER 904

RESET THE BUFFER 916

NO

CAN INPUT HOLD ANOTHER CHUNK? 914

YES

ACCESS THE NEXT CHUNK AND COMBINE THE CURRENT CHUNK WITH PREVIOUS CHUNKS IN THE BUFFER 906

GENERATE MEETING SUMMARY BY FORCING THE MODEL TO OUTPUT THE PREVIOUS SUMMARY FIRST 908

NO

ADDITIONAL SUMMARY? 910

YES

OUTPUT THE ADDITIONAL SUMMARY AND UPDATE THE BUFFER 912

FIG. 9

ONLINE MEETING SUMMARIZATION FOR VIDEOCONFERENCING

FIELD

The present application generally relates to videoconferencing, and more particularly relates to generating online meeting summaries for videoconferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 illustrates another example of generating online meeting summaries for videoconferencing, according to certain aspects of the present disclosure.

FIG. 9 shows a flowchart depicting a process for generating online meeting summaries for videoconferencing via sliding window-based segmentation of meeting transcripts, according to certain aspects of the present disclosure.

DETAILED DESCRIPTION

Figure 1:
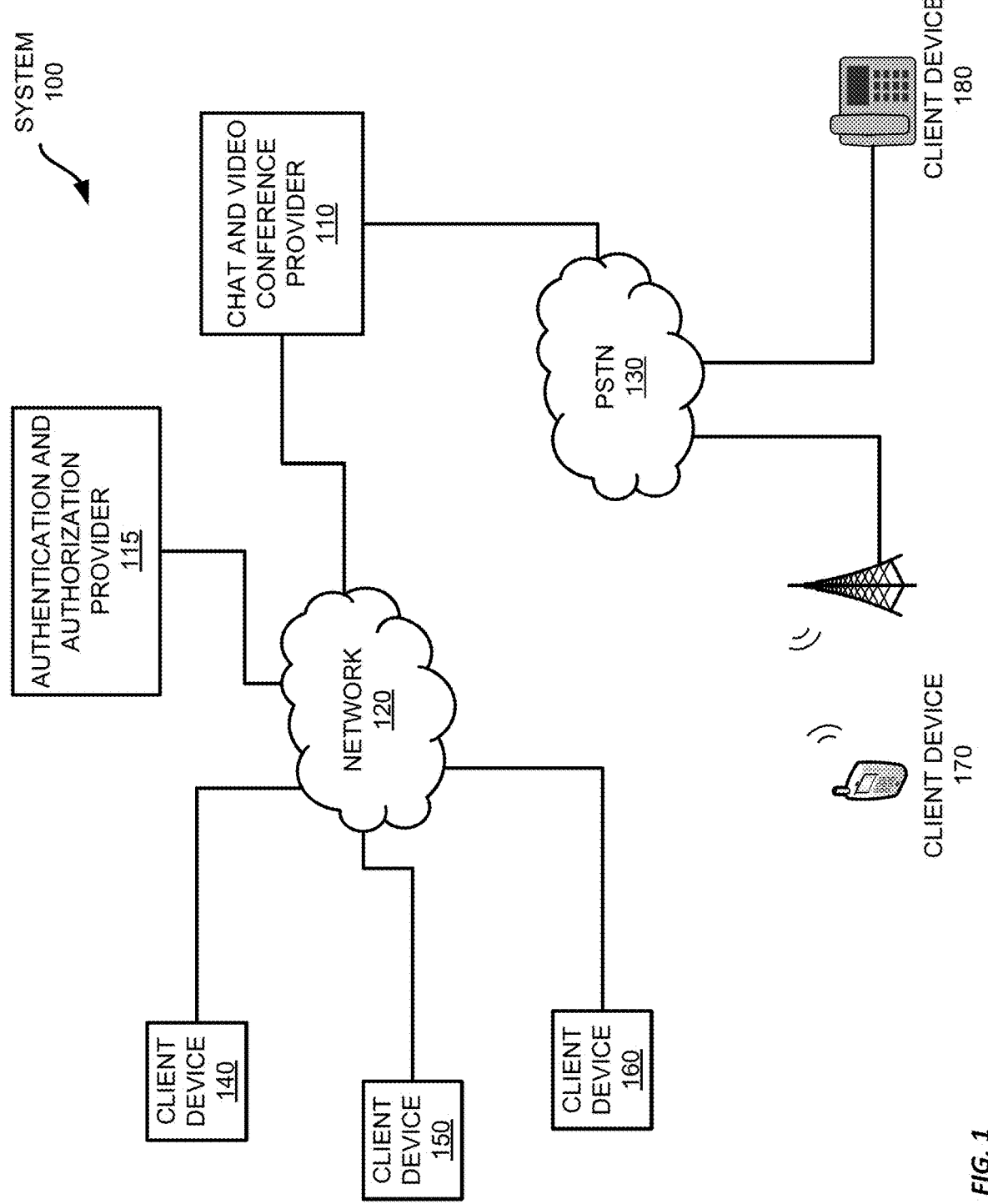
FIG. 1 shows an example system that provides videoconferencing functionality to various client devices, according to certain aspects described herein.

Examples are described herein in the context of systems and methods for generating online meeting summaries for videoconferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

Generating meeting summaries for a video conference is helpful for participants to review the key points of the meeting and the topics that were discussed. However, meeting summarization has been performed as an offline task, after the meeting concludes. Meeting summaries can be more useful while the meeting is still in progress. For example, online summaries can be useful for catching up with participants coming in late and providing live feedback on the coverage of an agenda. Also, producing the summaries while the participants are still present provides a unique opportunity for incorporating live human feedback in the meeting summarization.

It is, however, challenging to generate online meeting summaries because the meeting is still ongoing, and the transcripts of the meeting are not complete. Generating meeting summaries with incomplete transcripts may reduce the accuracy of the meeting summary. To solve these problems, examples of online meeting summary generators that incrementally process the transcripts of the meeting as input in real-time and accurately generate a summary are described herein.

In some examples, the online meeting summary generator can perform a model-based segmentation of the available transcripts to generate meeting summaries. For a chunk of the transcript, the online meeting summary generator can apply a meeting summarization model to generate a meeting summary. After the next chunk of transcript is received, another meeting summary can be generated by the model from the new chunk and the chunks received before the new chunk. This process can be repeated until, for example, the maximum input size of the model is reached. As a result, N summaries can be generated for a model that can take a maximum of N chunks as input. Each summary i is generated from chunk 1 to chunk i out of the N chunks. Among the N summaries, the summary that has the highest quality score can be selected and output as the meeting summary. The transcript chunks that are used to generate the selected summary can be discarded. The remaining transcript chunks can be kept for generating the next meeting summary. This process can be repeated to generate more meeting summaries for the ongoing meeting.

In other examples, the online meeting summary generator can perform a sliding window-based summary generation. When a chunk of meeting transcript is received, the online meeting summary generator can apply the meeting summarization model to generate a summary containing one or more sentences and output the summary for display to the participants. As the second chunk is received, both the first and second chunks are input to the model. To ensure the consistency of the output summary, the online meeting summary generator can force the model to generate the sentences in the previous summary first before generating new sentences. If new sentences are generated in the current round of process, the chunk(s) of transcripts used to generate the previous summary can be discarded; otherwise, that chunk(s) are still kept and included in the input for the next summary generation. This process can be repeated as more meeting transcripts are received.

The displayed summary may be edited by meeting participants. The edited version of the summary will be used to force the model to generate the edited version of that part of the summary when generating new summaries. In this way, the online meeting summary generator can take into account user's feedback and update the meeting summary generation before the meeting is concluded. In additional examples, a latency metric can be used to select from or switch between the above two approaches to generate online meeting summaries.

The generated meeting summaries may be presented in the user interface of the meeting application, such as in the chat user interface or a note user interface. The meeting summary may also be presented in a third-party online document sharing application where the meeting participants can view and edit the displayed summary.

As described herein, certain embodiments provide improvements to videoconferencing by solving problems that are specific to online platforms. Compared with existing offline meeting summary generation methods, generating online meeting summaries while the meeting is still ongoing can allow participants to catch up with the meeting, provide live feedback on the coverage of an agenda, and incorporate live human feedback in the meeting summarization, thereby increasing the accuracy of the meeting summarization. Further, by incrementally incorporating meeting transcripts as they are generated, the generated meeting summaries can adapt to the content of the meeting and provide consistent and continuous meeting summaries.

This illustrative example is given to introduce the reader to the general subject matter discussed herein and the disclosure is not limited to this example. The following sections describe various additional non-limiting examples and examples of systems and methods for generating online meeting summaries for videoconferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
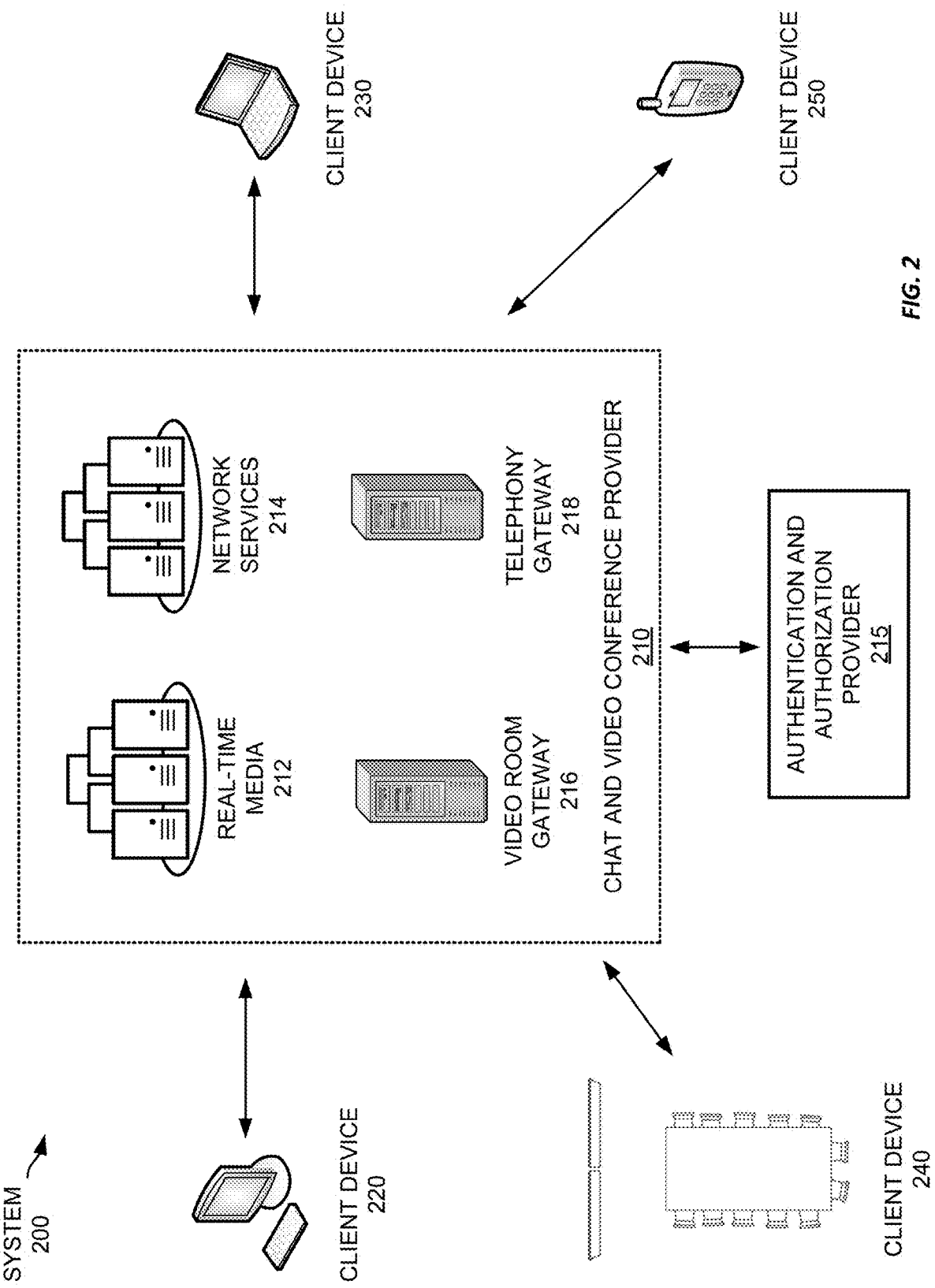
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating speech transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryptions may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multifrequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples according to the present disclosure, a user may select an option to use one or more optional AI features available from the virtual conference provider. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to provide training data for the underlying AI models, the user may be provided with an option to consent, or deny consent, to access and use some or all of the user's personal information. In general, the goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

Figure 3:
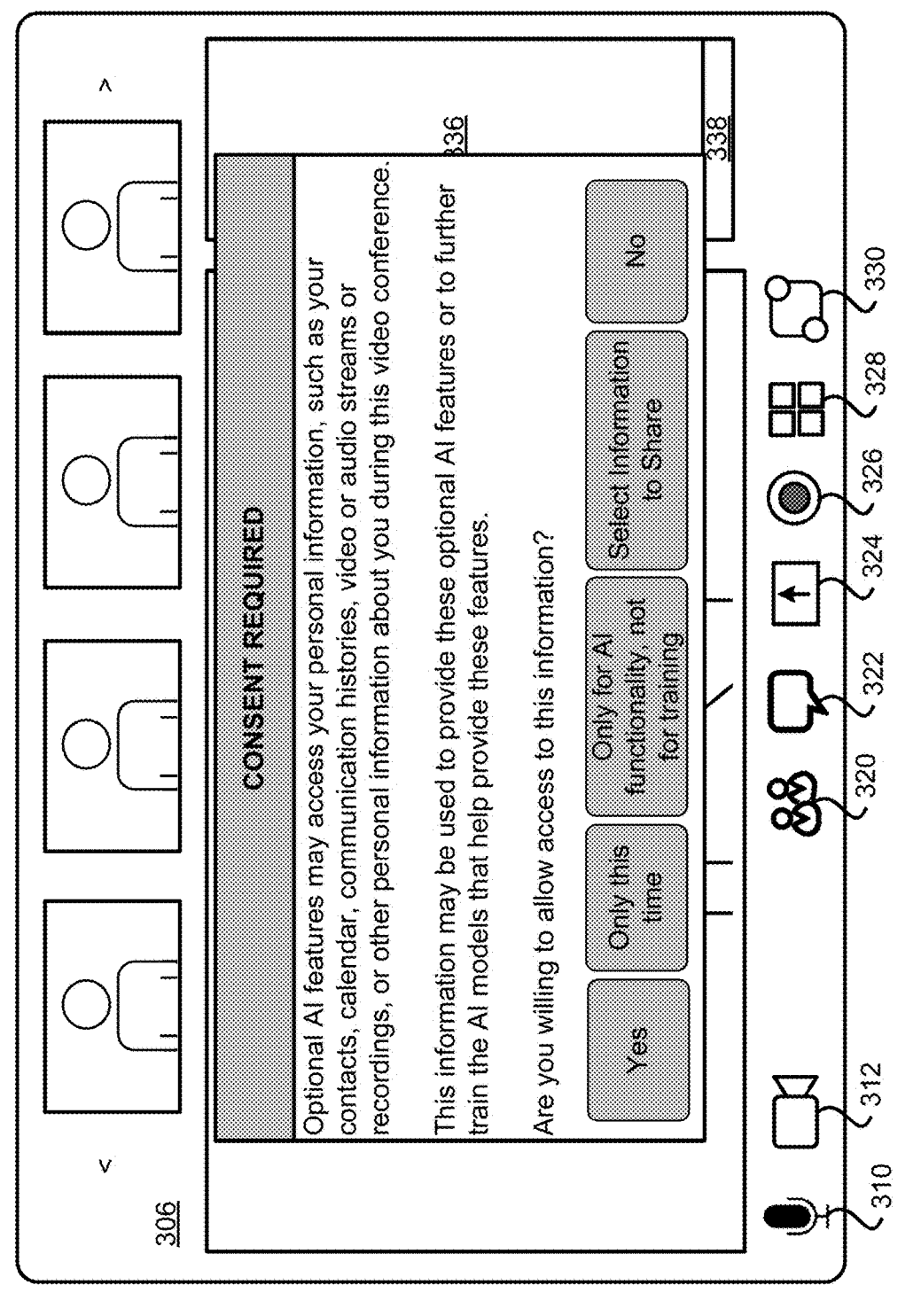
FIG. 3 shows an example of a user interface configured to display a consent authorization window for a user who has engaged in a video conference to interact with and to select options to use an available optional AI feature, according to certain aspects of the present disclosure.

As can be seen in FIG. 3, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 4:
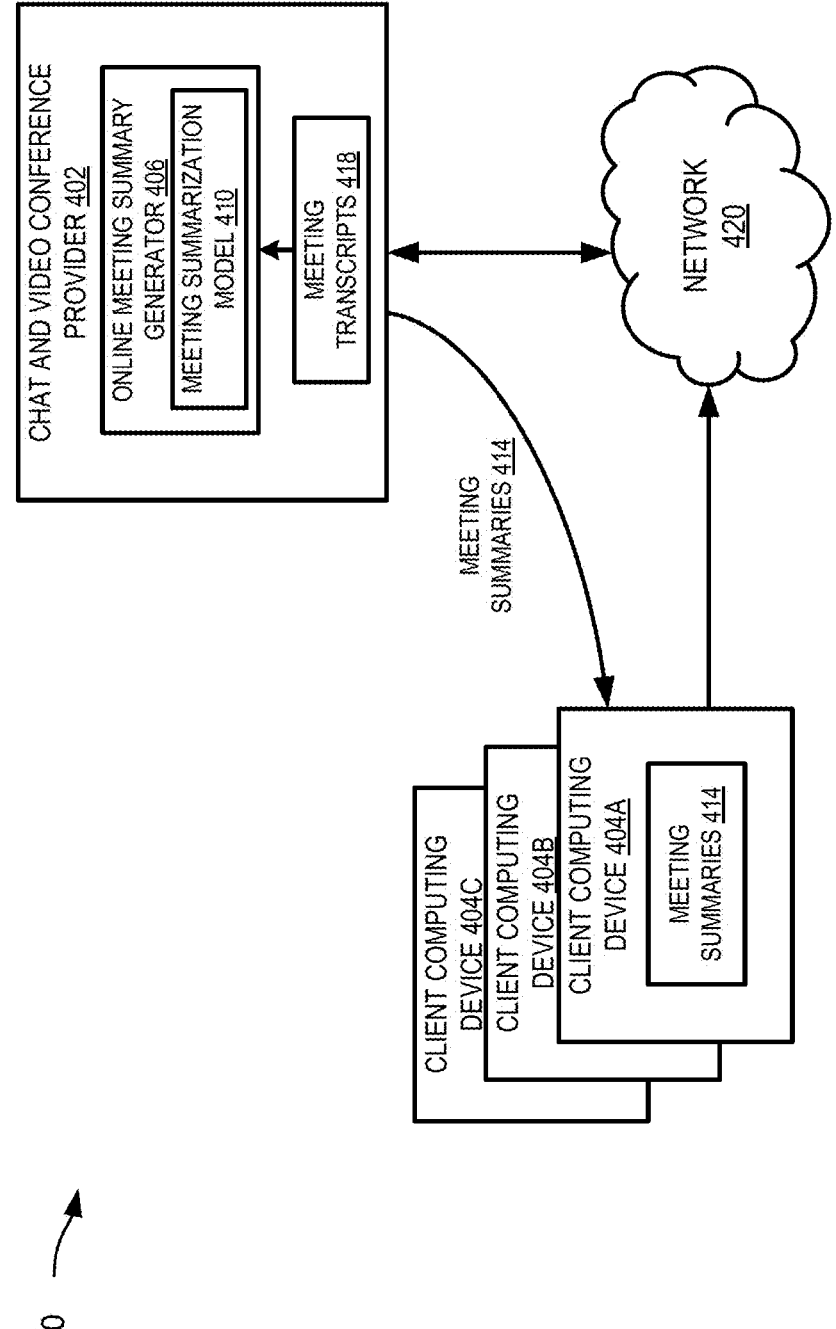
FIG. 4 shows an example of an operating environment for generating online meeting summaries for videoconferencing, according to certain aspects of the present disclosure.

Referring now to FIG. 4, FIG. 4 shows an example of an operating environment 400 for generating online meeting summaries for videoconferencing, according to certain aspects described herein. The operating environment 400 includes a chat and video conference provider 402 and client computing devices 404A-404C (which may be referred to herein individually as a client computing device 404 or collectively as the client computing devices 404). The chat and video conference provider 402 is configured to host and provide various functionalities of video conferences, such as the chat and video conference provider 110 and the chat and video conference provider 210 described above with respect to FIGS. 1 and 2, respectively. The chat and video conference provider 402 can collect and deliver videoconferencing streams to client computing devices. The video conferencing streams include video signals of the participants, audio signals 414 captured at respective client computing devices associated with the participants, and other signals or streams regarding the participants. The chat and video conference provider 402 can also generate, receive, or otherwise access transcripts 418 of the meeting. The transcripts 418 of the meeting may be generated using technologies such as Automatic Speech Recognition (ASR).

The client computing devices 404 may be the client devices 140-180 and 220-250 discussed above with respect to FIGS. 1 and 2. Each client computing device 404 can execute a video conference application through which a participant associated with the client computing device can join the video conference and view the content shared through the video conference. The chat and video conference provider 402 can execute the online meeting summary generator 406 to generate meeting summaries 414 (also referred to as "online meeting summaries 414") while a video conference is ongoing. To do so, the meeting transcripts 418 are continuously provided to the online meeting summary generator 406 as they are being generated during the video conference. The online meeting summary generator 406 receives the meeting transcripts 418 in segments and generates the meeting summaries 414 based on one or more segments using a meeting summarization model 410. The meeting summarization model 410 can be, for example, a Bart model, a large language model, or any extractive or abstractive summarizer including but not limited to, neural networks. Additional details regarding generating the meeting summaries 414 will be provided below with respect to FIGS. 5-10.

The generated meeting summaries 414 are transmitted to or made accessible by the client computing devices 404. For example, the chat and video conference provider 402 can transmit the meeting summaries 414 to the client computing device 404 which presents the meeting summaries 414 in the user interface of the video conference application such as in the chat window or note window. Alternatively, or additionally, the chat and video conference provider 402 may send the meeting summaries 414 to a third-party application, such as an online document sharing application, that is accessible by the participants of the video conference.

Figure 5:
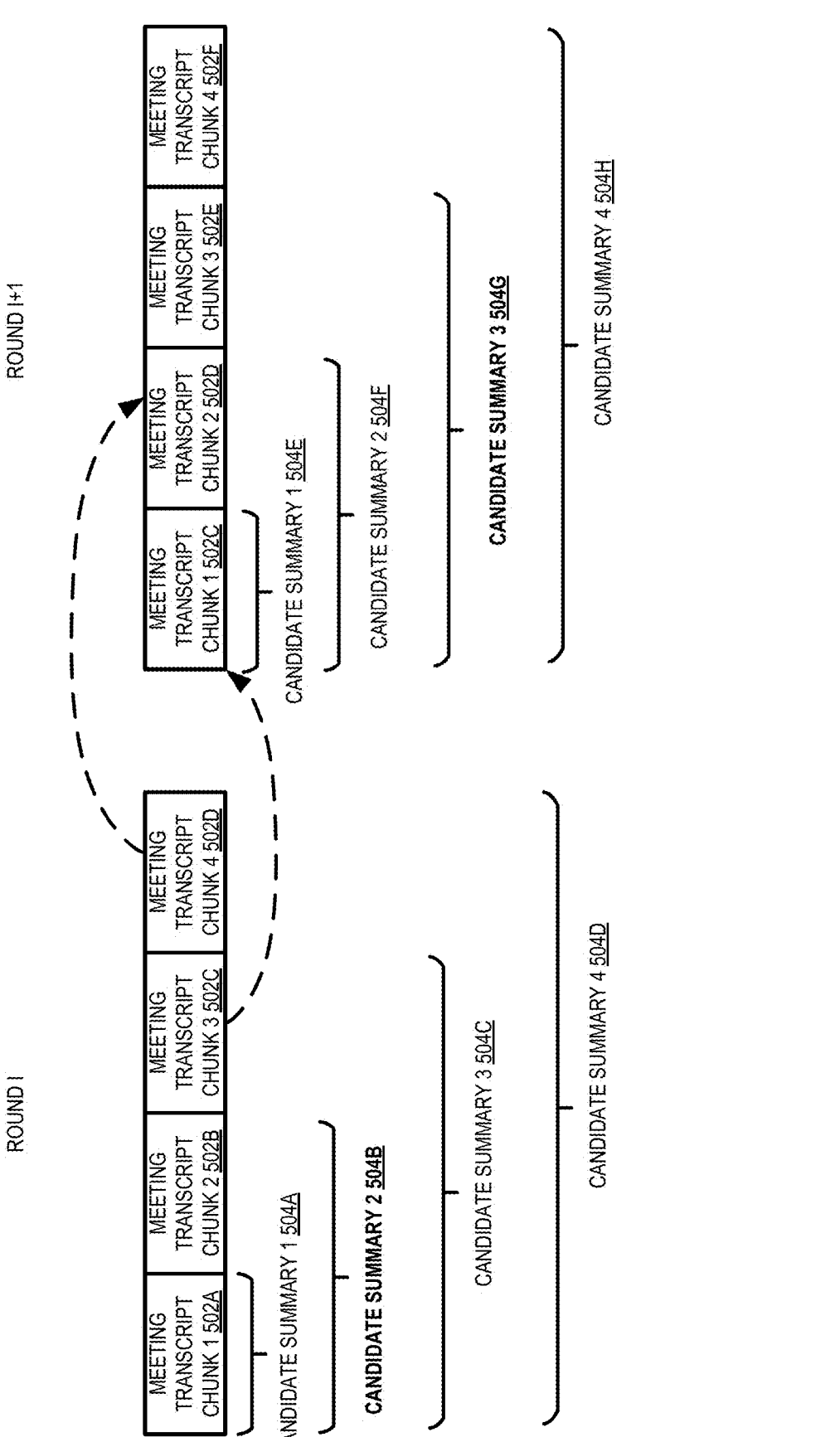
FIG. 5 illustrates an example of generating online meeting summaries for videoconferencing, according to certain aspects of the present disclosure.

Referring now to FIG. 5, FIG. 5 illustrates an example of generating online meeting summaries for videoconferencing, according to certain aspects of the present disclosure. As shown in FIG. 5, the meeting transcripts are received as the video conference progresses. The received meeting transcripts are segmented or grouped into chunks 502. In some examples, each chunk includes up to C tokens, where C is a hyperparameter. Chunks are constructed so that a "dialog turn" is not split up. A dialog turn is a series of consecutive tokens spoken by the same speaker.

In some examples, a model-based segmentation of the meeting transcripts is used to generate meeting summaries. In the model-based approach, a group of chunks are used to generate a meeting summary in each round of the process. The group of chunks can include a specific number of chunks. For example, the number of chunks in a group can be the maximum number of chunks that the meeting summarization model 410 can accept as input. In the example shown in FIG. 5, in round i, the group of chunks includes four chunks: chunk 1 502A to chunk 4 502D. As the four chunks are received one by one as the meeting proceeds, the online meeting summary generator 406 can generate candidate summaries 504A-504D. For example, when the online meeting summary generator 406 receives chunk 1 502A, it can generate candidate summary 1 504A by applying the meeting summarization model 410 to chunk 1 502A. When the online meeting summary generator 406 receives chunk 2 502B, it can generate candidate summary 2 504B by applying the meeting summarization model 410 to chunk 1 502A and chunk 2 502B. Similarly, candidate summary 3 504C can be generated based on chunk 1 502A to chunk 3 502C and candidate summary 4 504D can be generated based on chunk 1 502A to chunk 4 502D.

The online meeting summary generator 406 can further select a meeting summary from the candidate summaries 504A-504D as the meeting summary output in round i. In some examples, each candidate summary 504 is assigned a quality score and the online meeting summary generator 406 selects the candidate summary that has the highest quality score as the meeting summary 414 of the current round. The quality score can be, for example, a confidence score output by the meeting summarization model 410 when generating the corresponding candidate meeting summary. In another example, the quality score can be a similarity metric (e.g., cosine similarity) between the embeddings of the candidate meeting summary and the chunks used to generate the candidate meeting summary. The embeddings can be, for example, embeddings from Sentence-BERT (or sBERT), global vectors for word representation (GloVe), the generative pre-trained transformer 4 (GPT-4), or term frequency-inverse document frequency (TF-IDF). In the example shown in FIG. 5, candidate summary 2 504B has the highest quality score and is thus selected as the meeting summary for round i.

In the next round i+1, meeting transcript chunks 502 that are not used to generate the selected meeting summary for round i is included in the group of chunks and the same process described above can be repeated. For example, as shown in FIG. 5, meeting transcript chunks 502C and 502D are not used to generate the candidate summary 504B which is selected as the meeting summary for round i. As such, meeting transcript chunks 502C and 502D are included in the group of chunks for next round i+1 and used as chunk 1 and chunk 2, respectively. Based on meeting transcript chunk 502C, candidate summary 504E can be generated and based on meeting transcript chunks 502C and 502D, candidate summary 504E can be generated. As more meeting transcript chunks 502 are received, more candidate summaries can be generated, such as candidate summary 504G (based on meeting transcript chunks 502C-502E) and candidate summary 504H (based on meeting transcript chunks 502C-502F). Among the candidate summaries 504E-504H, the online meeting summary generator 406 selects the candidate summary having the highest quality score as the meeting summary for round i+1, that is, candidate summary 3 504G. Because meeting transcript chunk 502F is not used in generating candidate summary 504G, it will be included as the first chunk for round i+2. The above process will be repeated for round i+2 as more meeting transcript chunks are received. The meeting summarization based on the model-based segmentation of the meeting transcripts is discussed further below with respect to FIG. 8.

FIG. 6 illustrates another example of generating online meeting summaries for videoconferencing, according to certain aspects of the present disclosure. In this example, the meeting summarization can be performed based on a sliding window-based segmentation. In the first round of the process, when a portion of meeting transcript is received, such as a chunk of meeting transcript 602A, the online meeting summary generator 406 can apply the meeting summarization model 410 to generate a meeting summary 604A and output the summary for display to the participants. A meeting summary can include one or multiple sentences. The meeting transcript chunks 602 may be constructed in the same way as the meeting transcript chunks 502.

When new chunk 602B is received in round 2, both chunks 602A and 602B are input to the meeting summarization model 410. To ensure the consistency of the output summary, the online meeting summary generator 406 can force the meeting summarization model 410 to generate the sentences in the meeting summary 604A first before generating any new sentences. If new sentences are generated in the current round of process, the chunk(s) of transcripts used to generate the previous summary can be discarded; otherwise, that chunk(s) are kept and included in the input for the next summary generation. This process can be repeated as more meeting transcripts are received.

In the example shown in FIG. 6, in round 2, the same meeting summary 604A is generated from meeting transcript chunks 602A and 602B. As such, both chunks are kept and used in round 3 when meeting transcript chunk 602C is received. In this round, all three meeting transcript chunks 602A-602C are provided to the meeting summarization model 410 by forcing the model to output summary 604A first. As a result, the meeting summarization model 410 outputs summary 604A and further outputs summary 604B. Because new summary 604B has been generated, the meeting transcript chunk 602A that is used to generate the old summary 604A can be discarded. In round 4 when another meeting transcript chunk 602D is received, the meeting transcript chunks used for meeting summary generation include meeting transcript chunks 602B-602D. In this round, the meeting summarization model 410 is constrained to output summary 604B first before outputting additional summary 604C. In this way, consistency between generated summaries 604 in different rounds can be maintained.

Because in round 1, the generated summary 604A can be displayed, the displayed summary 604A may be edited by meeting participants before the next round of meeting summary generation. The edited version of summary 604A can be used to force the meeting summarization model 410 to generate the edited version of summary 604A when generating new summaries. In this way, the meeting summarization model 410 can take into account the feedback of the meeting participants and update the meeting summary generation before the meeting is concluded.

In alternative or additional examples, subsequently received transcript chunks can be provided to the meeting summarization model 410 along with the previously generated summary or summaries to generate a new summary. In this way, the transcript chunks used in generating the previous summaries do not need to be stored and provided to the meeting summarization model 410 thereby saving storage space and reducing computational complexity of the meeting summary generation.

Figure 7:
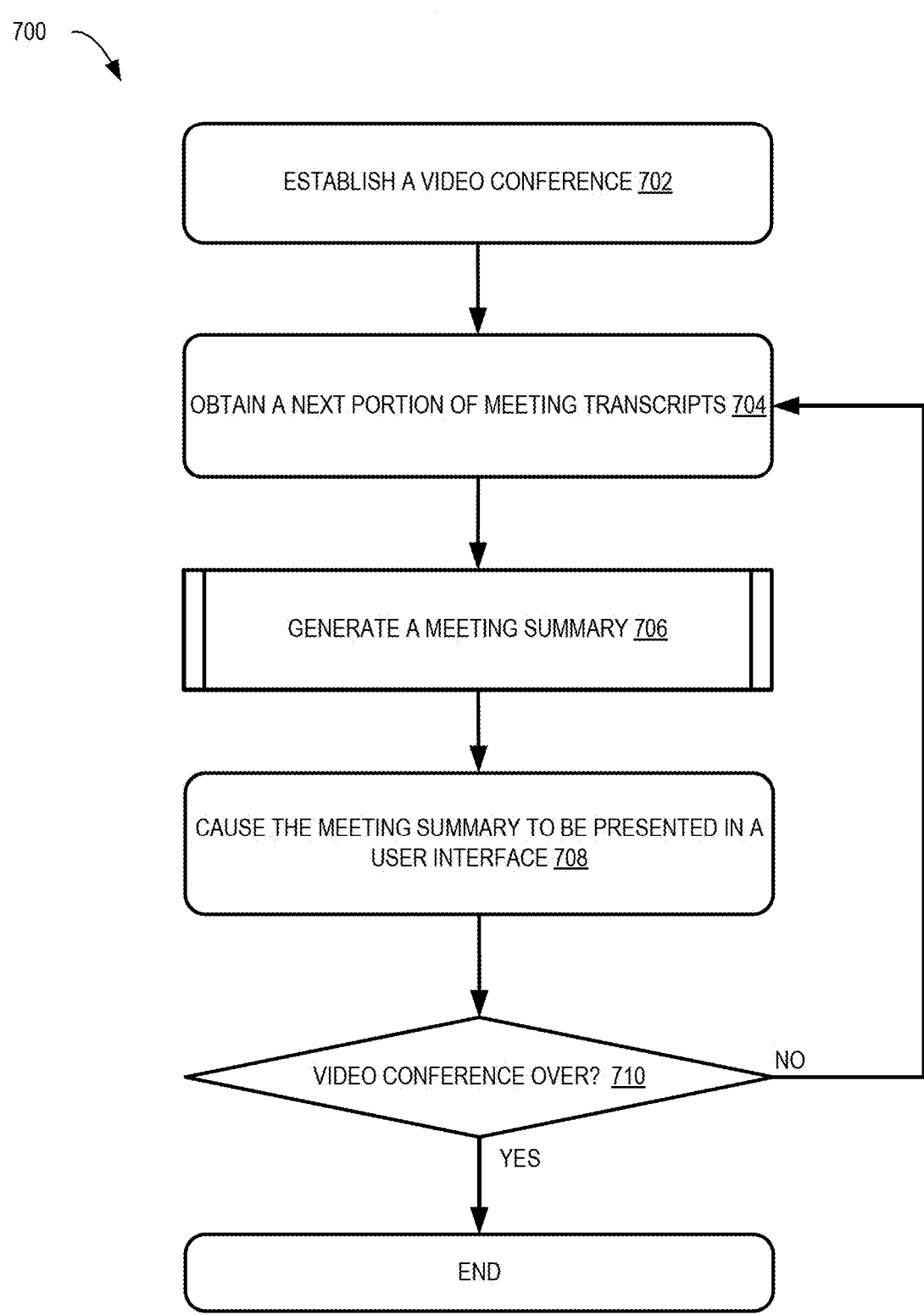
FIG. 7 shows a flowchart depicting a process for generating online meeting summaries for videoconferencing, according to certain aspects of the present disclosure.

FIG. 7 shows a flowchart depicting a process 700 for generating online meeting summaries for videoconferencing, according to certain aspects of the present disclosure. The chat and video conference provider 402 can be configured to implement operations depicted in FIG. 7 by executing suitable program code. The software or program code may be stored on a non-transitory storage medium (e.g., on a memory device). The process depicted in FIG. 7 and described below is intended to be illustrative and non-limiting. Although FIG. 7 depicts the various processing blocks occurring in a particular sequence or order, this is not intended to be limiting. In certain alternative embodiments, the blocks may be performed in some different order, or some blocks may also be performed in parallel. For illustrative purposes, the process 700 is described with reference to certain examples depicted in the figures. Other implementations, however, are possible.

At block 702, the process 700 involves establishing a video conference among multiple meeting participants as described above with respect to FIGS. 1 and 2. At block 704, the process 700 involves obtaining the next portion of the meeting transcripts. As the video conference progresses, the chat and video conference provider 402 continuously generates or otherwise receives meeting transcripts based on the meeting audio signals. For example, the chat and video conference provider 402 can generate the meeting transcripts based on the received audio signals of the meeting using technologies such as ASR. Alternatively, or additionally, separate computing device(s) can be employed to generate the meeting transcripts and transmit the generated transcripts to the chat and video conference provider 402 for meeting summary generation.

At block 706, the process 700 involves generating meeting summaries based on the obtained portion of the meeting transcripts. In some examples, meeting summary generation based on model-based segmentation of the available transcripts can be used, generally as discussed above with respect to FIG. 5. In these examples, the chat and video conference provider 402 can apply a meeting summarization model on different subsets of chunks of the transcripts to generate candidate meeting summaries. Among the generated candidate summaries, the summary that has the highest quality score can be selected and output as meeting summary. The transcript chunks that are used to generate the selected summary can be discarded. The remaining transcripts can be kept for generating the next meeting summary.

In other examples, a sliding window-based summary generation can be utilized, generally as discussed above with respect to FIG. 6. When a chunk of meeting transcripts is received, the chat and video conference provider 402 can apply the meeting summarization model to generate a summary containing one or more sentences and output the summary for display to the participants. As the second chunk is received, both the first and second chunks are input to the model. To ensure the consistency of the output summary, the online meeting summary generator can force the model to generate the sentences in the previous summary first before generating new sentences. If new sentences are generated in the current round of process, the chunk(s) of transcripts used to generate the previous summary can be discarded; otherwise, that chunk(s) are still kept and included in the input for the next summary generation. The meeting summary generation based on model-based segmentation and sliding window-based segmentation are described in more detail below with respect to FIGS. 8 and 9, respectively.

At block 708, the process 700 involves presenting the meeting summary in a user interface. As discussed above, the generated meeting summaries can be transmitted to or made accessible by the client computing devices 404 where the meeting summaries can be displayed. For example, the chat and video conference provider 402 can transmit the meeting summaries to each client computing device 404 which presents the meeting summaries in the user interface of the video conference application such as in the chat window or the note window. Alternatively, or additionally, the chat and video conference provider 402 may send the meeting summaries to a third-party application, such as an online document sharing application, that is accessible by the participants of the video conference.

At block 710, the process 700 involves determining whether the video conference is over. If not, the process 700 continues to process the next portion of the meeting transcripts from block 704 to generate additional meeting summaries. If the video conference is over, the process 700 ends.

Figure 8:
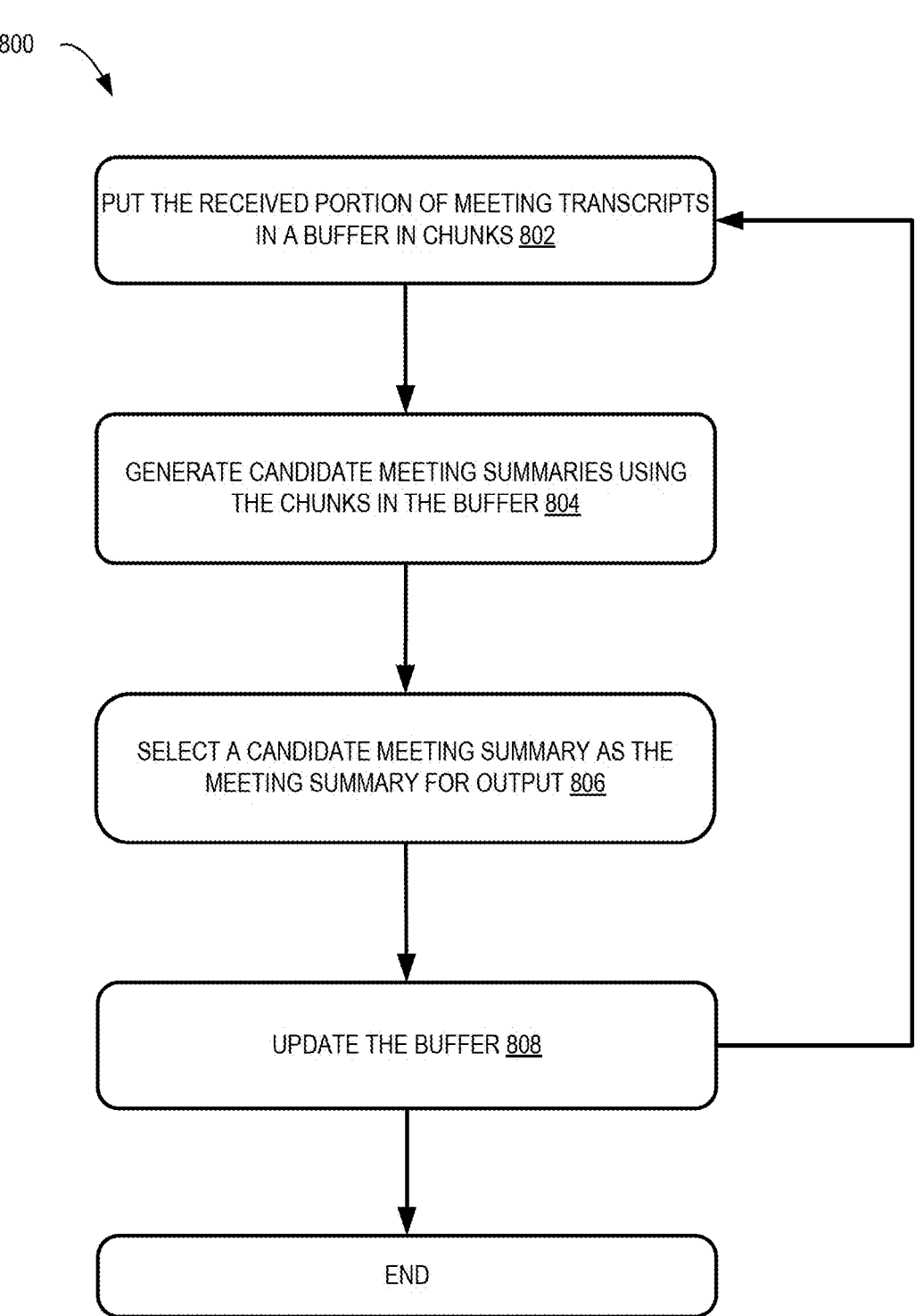
FIG. 8 shows a flowchart depicting a process for generating online meeting summaries for videoconferencing via model-based segmentation of meeting transcripts, according to certain aspects of the present disclosure.

FIG. 8 shows a flowchart depicting a process 800 for generating online meeting summaries for videoconferencing via model-based segmentation of meeting transcripts, according to certain aspects of the present disclosure. The chat and video conference provider 402 can be configured to implement operations depicted in FIG. 8 by executing suitable program code. The software or program code may be stored on a non-transitory storage medium (e.g., on a memory device). The process depicted in FIG. 8 and described below is intended to be illustrative and non-limiting. Although FIG. 8 depicts the various processing blocks occurring in a particular sequence or order, this is not intended to be limiting. In certain alternative embodiments, the blocks may be performed in some different order, or some blocks may also be performed in parallel. For illustrative purposes, the process 800 is described with reference to certain examples depicted in the figures. Other implementations, however, are possible.

At block 802, the process 800 involves putting the received portion of meeting transcripts in a buffer and dividing the meeting transcripts in chunks, such as the meeting transcript chunks 502 shown in FIG. 5. As discussed above, the chunks can be constructed to include up to C tokens in each chunk and a dialog turn is not split up into two different chunks. While a buffer is described herein to hold the transcript chunks, any other types of temporary storage mechanisms can be utilized to store the transcript chunks.

At block 804, the process 800 involves generating candidate meeting summaries using the transcript chunks in the buffer. For example, and as described above with respect to FIG. 5, the buffer can be set to hold a maximum of N chunks of transcripts and N chunks may be the maximum size of the input of the meeting summarization model 410. At the beginning of the process, as each chunk of the transcript is received, the chat and video conference provider 402 can apply the meeting summarization model 410 to the chunks in the buffer to generate a candidate meeting summary. As such, after a new chunk of transcript is received, a new candidate meeting summary can be generated by the model from the new chunk and the chunks received before the new chunk. This process can be repeated until the buffer has N chunks. As a result, N candidate summaries can be generated. Each summary i is generated from chunk 1 to chunk i out of the N chunks.

At block 806, the process 800 involves selecting a candidate meeting summary as the meeting summary for output. Among the N candidate summaries generated in block 804, the candidate summary that has the highest quality score can be selected and output as a meeting summary. At block 808, the process 800 involves updating the buffer. To update the buffer, the transcript chunks that are used to generate the selected summary are discarded. The remaining transcripts are kept in the buffer for generating the next meeting summary. For example, if candidate summary i is selected for output, chunk 1 to chunk i can be discarded. Chunks i+1, i+2, . . . j are renumbered as chunks 1, 2, . . . , j−2 respectively, in the buffer for the next round.

As more meeting transcript chunks are received, blocks 802-808 can be repeated. For example, in the second round, chunk 1 in the buffer is used to generate the first candidate summary, chunks 1 and 2 are used to generate the second candidate summary, and chunks 1 to j−2 are used to generate the (j−2)-th candidate summary. As more transcript chunks are received and stored in the buffer, more candidate meeting summaries can be generated as described above until the maximum N chunks are received and N candidate summaries are received. Again, the candidate summary that has the highest quality score is selected and output as a meeting summary. The transcript chunks that are used to generate the selected summary are discarded and the remaining transcripts are kept in the buffer for generating the next meeting summary. The above process can be repeated to generate more meeting summaries for the ongoing meeting.

FIG. 9 shows a flowchart depicting a process 900 for generating online meeting summaries for videoconferencing via sliding window-based segmentation of meeting transcripts, according to certain aspects of the present disclosure. The chat and video conference provider 402 can be configured to implement operations depicted in FIG. 9 by executing suitable program code. The software or program code may be stored on a non-transitory storage medium (e.g., on a memory device). The process depicted in FIG. 9 and described below is intended to be illustrative and non-limiting. Although FIG. 9 depicts the various processing blocks occurring in a particular sequence or order, this is not intended to be limiting. In certain alternative embodiments, the blocks may be performed in some different order, or some blocks may also be performed in parallel. For illustrative purposes, the process 900 is described with reference to certain examples depicted in the figures. Other implementations, however, are possible.

At block 902, the process 900 involves putting the received portion of meeting transcripts in a buffer and dividing the meeting transcripts in chunks, such as the meeting transcript chunks 602 shown in FIG. 6. As discussed above, the chunks can be constructed to include up to C tokens in each chunk and a dialog turn is not split up into two different chunks. While a buffer is described herein to hold the transcript chunks, any other types of temporary storage mechanisms can be utilized to store the transcript chunks.

At block 904, the process 900 involves generating and outputting a meeting summary using the first transcript chunk in the buffer. As discussed above with respect to FIG. 6, the chat and video conference provider 402 can apply the meeting summarization model 410 to the transcript chunk to generate a meeting summary and output the meeting summary for display in the video conference application or in a third-party application.

At block 906, the process 900 involves accessing the next transcript chunk in the buffer and combining the transcript chunk with previous transcript chunk(s) in the buffer. In some examples, the combination is performed by concatenating the previous transcript chunks with the current transcript chunk. At block 908, the process 900 involves generating an updated meeting summary by forcing the meeting summarization model 410 to output a meeting summary prefix first before outputting additional meeting summary, if there is any. The meeting summary prefix in this example is the previous meeting summary. At block 910, the process 900 involves determining whether additional meeting summary was generated at block 908. If not, the process 900 involves, at block 914, determining whether the input can hold another chunk. If so, the process 900 involves accessing the next transcript chunk and combining it with the previous chunks at block 906. If an additional meeting summary was generated, the process 900 involves, at block 912, outputting the additional summary for display and updating the buffer. In some examples, updating the buffer includes discarding transcript chunks except for those that were added since the last fresh output. In other words, transcript chunks that were accessed and used since the previous meeting summary is first generated are kept and the transcript chunks received before those chunks are discarded. In the example shown in FIG. 6, when additional meeting summary 604B is generated in round 3, meeting transcript chunks accessed and used since the meeting summary 604A was first generated in round 1 (i.e., meeting transcript chunks 602B-602C) are kept in round 4 and previous chunk 602A is discarded. The additional meeting summary becomes the meeting summary prefix and the process 900 continues to block 906 for the next chunk in the buffer.

If, at block 914, it is determined that the input cannot hold another chunk, the process 900 involves resetting the buffer at block 916. Resetting the buffer includes discarding the meeting summary prefix and transcript chunks except for those that were accessed since the last fresh output. That is, transcript chunks that were accessed and used since the previous meeting summary is first generated are kept and the transcript chunks received before those chunks are discarded. The process 900 further involves starting processing the first chunk in the reset buffer at block 904 as discussed above.

The sliding window-based approach does not rely on external quality estimation and only uses the model's outputs as a segmentation signal. The advantage of the sliding window-based method is that this approach takes into account the previous meeting summary outputs, which reduces the redundancy in the meeting summarization. Further, because the meeting summary is output once it is generated, the meeting summarization model 410 could respond to any user edits to the summary by incorporating the edits in the generation of the meeting summary in the next round.

Figure 10:
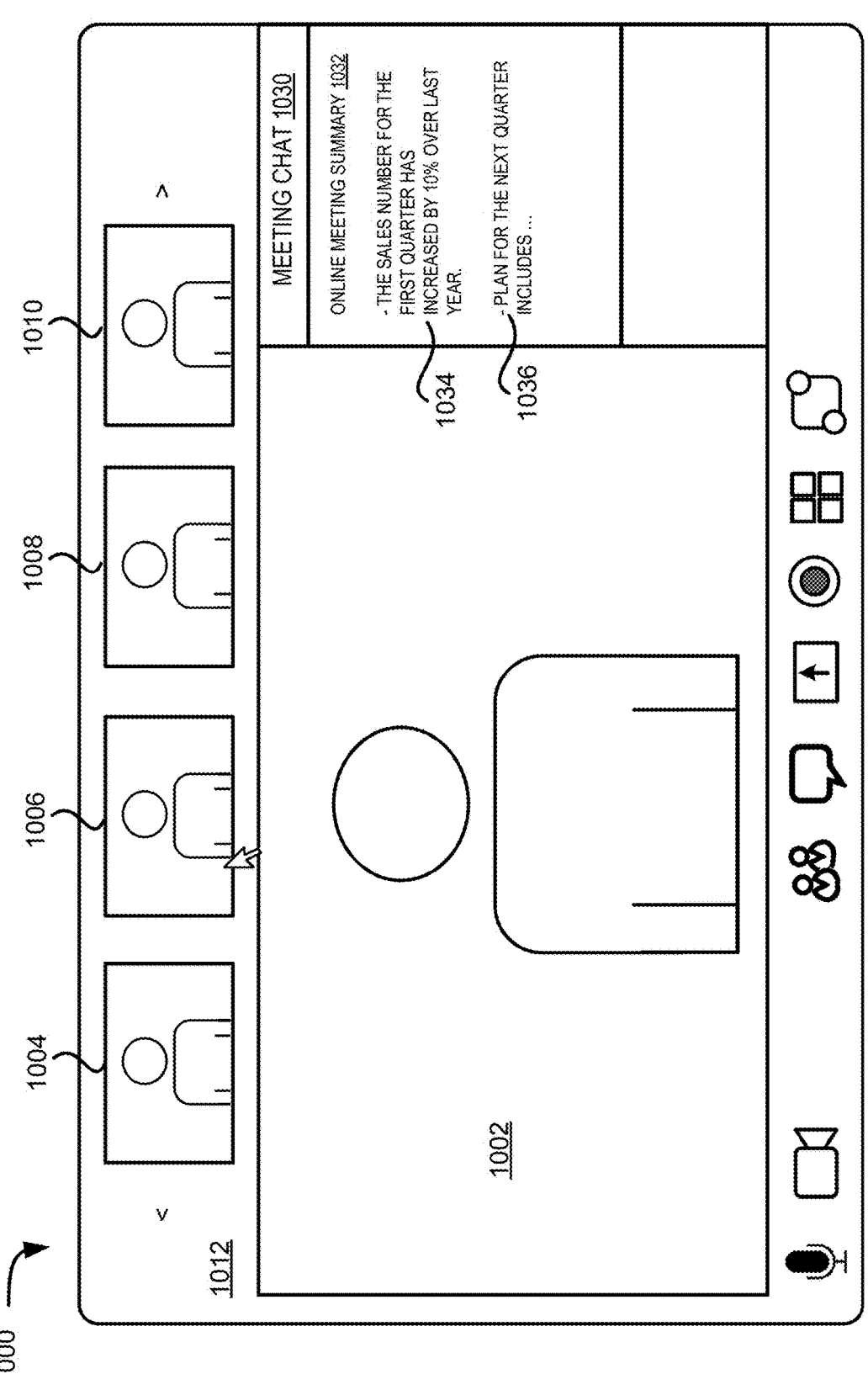
FIG. 10 shows an example of a user interface of a video conference application where the online meeting summaries are displayed, according to certain aspects of the present disclosure.

FIG. 10 shows an example of a user interface 1000 of a video conference application where online meeting summaries are displayed, according to certain aspects of the present disclosure. The user interface 1000 shown in FIG. 10 is an example of the user interface of a video conference application used by participants to join a video conference. In this example, the user interface 1000 includes a primary display area 1002 showing the video of the active speaker and a secondary display area 1012 showing the videos of the remaining participants 1004-1010. The user interface 1000 further includes a tool area at the bottom showing the icons of various tools that can be invoked for the video conferencing, such as the chat tool, the tool for displaying the participant list, the tool for sharing screen, the tool for recording the meeting, and the tools for configuring the microphone and the camera of the client computing device. In the example shown in FIG. 10, the online meeting summaries are displayed in the meeting chat window 1030. The meeting summaries are grouped under the online meeting summary section 1032 so that they are not to be confused with regular chat messages.

As the online meeting summaries are being generated as described above with respective FIGS. 5-9, they are being displayed in the online meeting summary section 1032 one by one. For example, when a first meeting summary is generated based on a first portion of the transcript of the meeting, the first meeting summary 1034 is displayed in the online meeting summary section 1032. As the meeting progresses and a second summary is generated, the second meeting summary 1036 is displayed after the first meeting summary 1034. Although FIG. 10 shows that the meeting summaries are displayed as bullet points, they can be displayed in other formats, for example, as continuous sentences in a paragraph or in a table. In some cases, a timestamp of the portion of the transcript where the meeting summary is generated is also displayed along with the meeting summary. Various other ways to display the generated online meeting summaries can be utilized.

To measure the performance of the online summarization approaches, latency is an important factor. Latency is the time between a piece of content appearing in the source and its appearing in the output. However, measuring latency requires an alignment between the output and the source, to establish which content from the output matches with which parts of the source. Producing such an alignment is computationally expensive. To simplify the problem and reduce the computational complexity, an expected latency (EL) is described herein. EL calculation is based on an assumption that the summarization output contains all relevant content from the source that appeared since the last output. Given this simplification, calculating latency reduces to answering the question: "Sampling a random point in the meeting, how long does one have to wait for the next summary?" This leads to an interpretable metric with which one can reason about the delay of different systems.

Formally, EL can be defined as:

$$EL = E[N(t) - t] \qquad (1)$$

where t is a point in time from a uniform distribution over the input and N (t) is the timestamp of the next output event after time t. In practice, this becomes:

$$EL = \frac{1}{T} \sum_{s \in S \cup \{0\}} \frac{(N(s) - s)^2}{2} \qquad (2)$$

With the above definition, EL for different summarization approaches can be calculated. The approach that leads to the lowest EL can be selected for online meeting summarization. For example, at the beginning of a video conference, both model-based approach and sliding window-based approach can be used to determine the online summaries for a test time period, such as one minute. The one that leads to a lower EL value can be selected for generating online summaries for the next execution time period (e.g., 15 minutes). After the execution time period, both approaches can be tested again to select the better approach for the next execution time period. This process can be repeated until the meeting ends. Likewise, other quality metrics can be used in place of, or in addition to, the EL to evaluate the performance of the available online summarization approaches and select the one that leads to a better performance.

It should be noted that while the above description focuses on the chat and video conference provider 402 generating the online meeting summaries 414, other computing devices can be employed to generate the summaries. Those computing devices can transmit the generated online meeting summaries to the chat and video conference provider 402 or directly to the client computing devices 404 for display.

Figure 11:
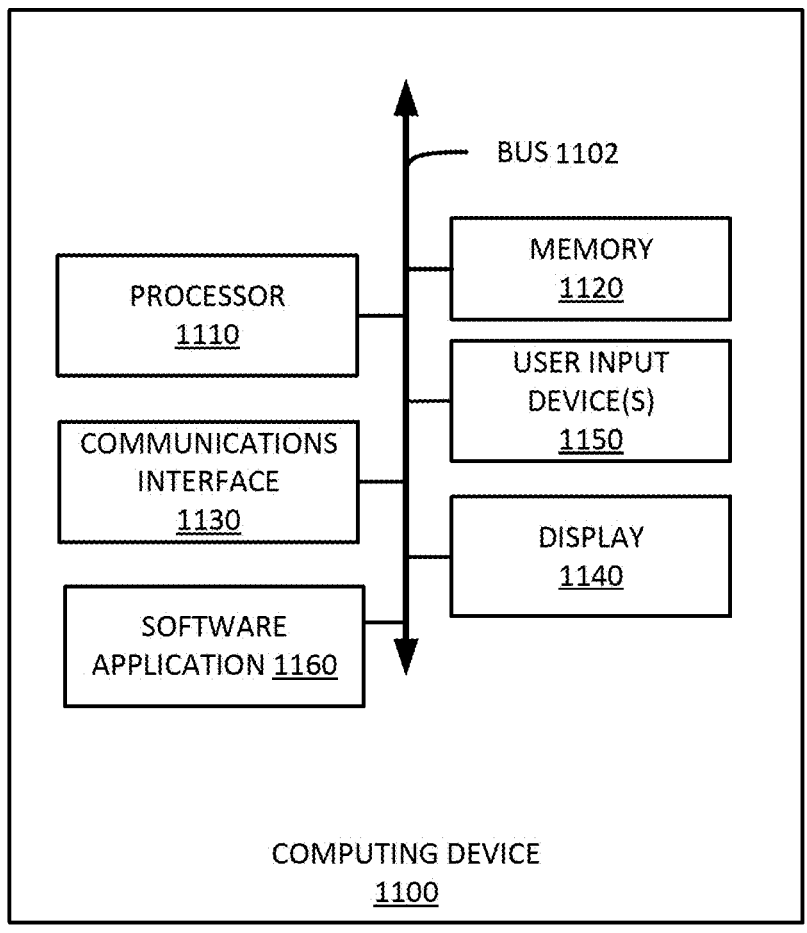
FIG. 11 shows an example computing device suitable for performing certain aspects of the present disclosure.

Referring now to FIG. 11, FIG. 11 shows an example computing device 1100 suitable for performing certain aspects of the present disclosure. The example computing device 1100 includes a processor 1110 which is in communication with the memory 1120 and other components of the computing device 1100 using one or more communications buses 1102. The processor 1110 is configured to execute processor-executable instructions stored in the memory 1120 to perform one or more processes described herein, such as part or all of the example processes 700-900 described above with respect to FIGS. 7-9, respectively. For example, the software application 1160 provided on the computing device 1100 may provide instructions for performing one or more steps of the process 700, 800, or 900. The computing device, in this example, also includes one or more user input devices 1150, such as a keyboard, mouse, touchscreen, video input device (e.g., one or more cameras), microphone, etc., to accept user input. The computing device 1100 also includes a display 1140 to provide visual output to a user.

The computing device 1100 also includes a communications interface 1130. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: a method performed by one or more computing devices, the method comprising: establishing a video conference for a plurality of participants; while the video conference is in progress, receiving a first portion of a transcript of the video conference; generating a first meeting summary based on the first portion of the transcript; causing the first meeting summary to be presented in a user interface accessible by a client computing device associated with at least one of the plurality of participants; receiving a second portion of the transcript of the video conference; generating a second meeting summary based on the first portion and the second portion of the transcript; and causing the second meeting summary to be presented in the user interface.

Example #2: The method of Example #1, wherein the first portion of the transcript comprises a plurality of chunks, and wherein generating the first meeting summary comprises: generating a plurality of candidate meeting summaries by applying a meeting summarization model to different subsets of chunks in the plurality of chunks; and selecting a candidate meeting summary from the plurality of candidate meeting summaries that has a highest quality score as the first meeting summary.

Example #3: The method of Examples #1-2, wherein the quality score comprises one or more of a confidence score output by the meeting summarization model or a similarity metric calculated based on embeddings of the candidate meeting summary and the corresponding subset of chunks.

Example #4: The method of Examples #1-3, wherein generating the plurality of candidate meeting summaries comprises: generating a first candidate meeting summary by providing a first chunk into a meeting summarization model; generating a second candidate meeting summary by providing the first chunk and a second chunk into the meeting summary model; and generating a third candidate meeting summary by providing the plurality of chunks into the meeting summary model.

Example #5: The method of Examples #1-4, wherein generating the second meeting summary based on the first portion and the second portion of the transcript comprises: generating a second plurality of candidate meeting summaries by applying the meeting summarization model to subsets of chunks in the second portion of the transcript and one or more of the chunks in the first portion of the transcript that are not used in generating the selected candidate meeting summary.

Example #6: The method of Examples #1-5, wherein the second meeting summary comprises the first meeting summary and an additional meeting summary, and wherein: generating the first meeting summary comprises applying a meeting summarization model to the first portion of the transcript; generating the second meeting summary based on the first portion and the second portion of the transcript comprises applying the meeting summary model to a concatenation of the first portion of the transcript and the second portion of the transcript by forcing the meeting summary model to output the first meeting summary before the additional meeting summary in the second meeting summary is output; and presenting the second meeting summary in the user interface comprises presenting the additional meeting summary.

Example #7: The method of Examples #1-6, further comprising: receiving a third portion of the transcript of the video conference; generating a third meeting summary based on the second portion and the third portion of the transcript by applying the meeting summarization model to a concatenation of the second portion of the transcript and the third portion of the transcript by forcing the meeting summary model to output the second meeting summary before other meeting summary in the third meeting summary is output; and presenting the other meeting summary in the third meeting summary in the user interface.

Example #8: The method of Examples #1-7, further comprising: receiving an edit to the first meeting summary, wherein generating the second meeting summary based on the first portion and the second portion of the transcript comprises applying the meeting summarization model to a concatenation of the first portion of the transcript and the second portion of the transcript by forcing the meeting summary model to output the edited first meeting summary before the additional meeting summary in the second meeting summary is output.

Example #9: A computing device, comprising: a non-transitory computer-readable medium; and a processor communicatively coupled to the non-transitory computer-readable medium, the processor configured to execute processor-executable instructions stored in the non-transitory computer-readable medium to: establish a video conference for a plurality of participants; while the video conference is in progress, receive a first portion of a transcript of the video conference; generate a first meeting summary based on the first portion of the transcript; cause the first meeting summary to be presented in a user interface accessible by a client computing device associated with at least one of the plurality of participants; receive a second portion of the transcript of the video conference; generate a second meeting summary based on the first portion and the second portion of the transcript; and cause the second meeting summary to be presented in the user interface.

Example #10: The computing device of Example #9, wherein the first portion of the transcript comprises a plurality of chunks, and wherein generating the first meeting summary comprises: generating a plurality of candidate meeting summaries by applying a meeting summarization model to different subsets of chunks in the plurality of chunks; and selecting a candidate meeting summary from the plurality of candidate meeting summaries that has a highest quality score as the first meeting summary.

Example #11: The computing device of Examples #9-10, wherein the quality score comprises one or more of a confidence score output by the meeting summarization model or a similarity metric calculated based on embeddings of the candidate meeting summary and the corresponding subset of chunks.

Example #12: The computing device of Examples #9-11, wherein generating the plurality of candidate meeting summaries comprises: generating a first candidate meeting summary by providing a first chunk into a meeting summarization model; generating a second candidate meeting summary by providing the first chunk and a second chunk into the meeting summary model; and generating a third candidate meeting summary by providing the plurality of chunks into the meeting summary model.

Example #13: The computing device of Examples #9-12, wherein generating the second meeting summary based on the first portion and the second portion of the transcript comprises: generating a second plurality of candidate meeting summaries by applying the meeting summarization model to subsets of chunks in the second portion of the transcript and one or more of the chunks in the first portion of the transcript that are not used in generating the selected candidate meeting summary.

Example #14: The computing device of Examples #9-13, wherein the second meeting summary comprises the first meeting summary and an additional meeting summary, and wherein: generating the first meeting summary comprises applying a meeting summarization model to the first portion of the transcript; generating the second meeting summary based on the first portion and the second portion of the transcript comprises applying the meeting summary model to a concatenation of the first portion of the transcript and the second portion of the transcript by forcing the meeting summary model to output the first meeting summary before the additional meeting summary in the second meeting summary is output; and presenting the second meeting summary in the user interface comprises presenting the additional meeting summary.

Example #15: The computing device of Examples #9-14, wherein the processor is configured to execute the processor-executable instructions stored in the non-transitory computer-readable medium to further: receive a third portion of the transcript of the video conference; generate a third meeting summary based on the second portion and the third portion of the transcript by applying the meeting summarization model to a concatenation of the second portion of the transcript and the third portion of the transcript by forcing the meeting summary model to output the second meeting summary before other meeting summary in the third meeting summary is output; and present the other meeting summary in the third meeting summary in the user interface.

Example #16: A non-transitory computer-readable medium comprising processor-executable instructions configured to cause one or more processors to: establish a video conference for a plurality of participants; while the video conference is in progress, receive a first portion of a transcript of the video conference; generate a first meeting summary based on the first portion of the transcript; cause the first meeting summary to be presented in a user interface accessible by a client computing device associated with at least one of the plurality of participants; receive a second portion of the transcript of the video conference; generate a second meeting summary based on the first portion and the second portion of the transcript; and cause the second meeting summary to be presented in the user interface.

Example #17: The non-transitory computer-readable medium of Example #16, wherein the first portion of the transcript comprises a plurality of chunks, and wherein generating the first meeting summary comprises: generating a plurality of candidate meeting summaries by applying a meeting summarization model to different subsets of chunks in the plurality of chunks; and selecting a candidate meeting summary from the plurality of candidate meeting summaries that has a highest quality score as the first meeting summary.

Example #18: The non-transitory computer-readable medium of Examples #16-17, wherein the quality score comprises one or more of a confidence score output by the meeting summarization model or a similarity metric calculated based on embeddings of the candidate meeting summary and the corresponding subset of chunks.

Example #19: The non-transitory computer-readable medium of Examples #16-18, wherein generating the plurality of candidate meeting summaries comprises: generating a first candidate meeting summary by providing a first chunk into a meeting summarization model; generating a second candidate meeting summary by providing the first chunk and a second chunk into the meeting summary model; and generating a third candidate meeting summary by providing the plurality of chunks into the meeting summary model.

Example #20: The non-transitory computer-readable medium of Examples #16-19, wherein the second meeting summary comprises the first meeting summary and an additional meeting summary, and wherein: generating the first meeting summary comprises applying a meeting summarization model to the first portion of the transcript; generating the second meeting summary based on the first portion and the second portion of the transcript comprises applying the meeting summary model to a concatenation of the first portion of the transcript and the second portion of the transcript by forcing the meeting summary model to output the first meeting summary before the additional meeting summary in the second meeting summary is output; and presenting the second meeting summary in the user interface comprises presenting the additional meeting summary.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by one or more computing devices, the method comprising:

establishing a video conference for a plurality of participants;

while the video conference is in progress, receiving a first portion of a transcript of the video conference;

generating a first meeting summary based on the first portion of the transcript comprising:

determining different sets of chunks based on the first portion of the transcript, each set of chunks comprising a different subset of one or more chunks of the first portion of the transcript, generating a plurality of candidate meeting summaries comprising applying a meeting summarization model to the different sets of chunks, and selecting a candidate meeting summary from the plurality of candidate meeting summaries that has a highest quality score as the first meeting summary, causing the first meeting summary to be presented in a user interface accessible by a client computing device associated with at least one of the plurality of participants;

receiving a second portion of the transcript of the video conference;

generating a second meeting summary based on the first portion and the second portion of the transcript; and causing the second meeting summary to be presented in the user interface.

2. The method of claim 1, wherein a quality score comprises one or more of a confidence score output by the meeting summarization model or a similarity metric calculated based on embeddings of a corresponding candidate meeting summary and the corresponding set of chunks.

3. The method of claim 1, wherein generating the plurality of candidate meeting summaries comprises:

generating a first candidate meeting summary by providing a first chunk into the meeting summarization model;

generating a second candidate meeting summary by providing the first chunk and a second chunk into the meeting summary model; and generating a third candidate meeting summary by providing the one or more chunks into the meeting summary model.

4. The method of claim 1, wherein generating the second meeting summary based on the first portion and the second portion of the transcript comprises:

generating a second plurality of candidate meeting summaries by applying the meeting summarization model to subsets of chunks in the second portion of the transcript and one or more of the chunks in the first portion of the transcript that are not used in generating the selected candidate meeting summary.

5. The method of claim 1, wherein the second meeting summary comprises the first meeting summary and an additional meeting summary, and wherein:

generating the first meeting summary comprises applying the meeting summarization model to the first portion of the transcript;

generating the second meeting summary based on the first portion and the second portion of the transcript comprises applying the meeting summary model to a first concatenation of the first portion of the transcript and the second portion of the transcript by forcing the meeting summary model to output the first meeting summary before the additional meeting summary in the second meeting summary is output; and presenting the second meeting summary in the user interface comprises presenting the additional meeting summary.

6. The method of claim 5, further comprising:

receiving a third portion of the transcript of the video conference;

generating a third meeting summary based on the second portion and the third portion of the transcript by applying the meeting summarization model to a concatenation of the second portion of the transcript and the third portion of the transcript by forcing the meeting summary model to output the second meeting summary before other meeting summary in the third meeting summary is output; and presenting the other meeting summary in the third meeting summary in the user interface.

7. The method of claim 5, further comprising:

receiving an edit to the first meeting summary, wherein generating the second meeting summary based on the first portion and the second portion of the transcript comprises applying the meeting summarization model to a second concatenation of the first portion of the transcript and the second portion of the transcript by forcing the meeting summary model to output the edited first meeting summary before the additional meeting summary in the second meeting summary is output.

8. A computing device, comprising:

a non-transitory computer-readable medium; and a processor communicatively coupled to the non-transitory computer-readable medium, the processor configured to execute processor-executable instructions stored in the non-transitory computer-readable medium to:

establish a video conference for a plurality of participants;

while the video conference is in progress, receive a first portion of a transcript of the video conference;

generate a first meeting summary based on the first portion of the transcript, comprising executing processor-executable instructions stored in the non-transitory computer-readable medium to:

determine different sets of chunks based on the first portion of the transcript, each set of chunks comprising a different subset of one or more chunks of the first portion of the transcript, apply a meeting summarization model to the different sets of chunks to generate a plurality of candidate meeting summaries, and select a candidate meeting summary from the plurality of candidate meeting summaries that has a highest quality score as the first meeting summary;

cause the first meeting summary to be presented in a user interface accessible by a client computing device associated with at least one of the plurality of participants;

receive a second portion of the transcript of the video conference;

generate a second meeting summary based on the first portion and the second portion of the transcript; and cause the second meeting summary to be presented in the user interface.

9. The computing device of claim 8, wherein a quality score comprises one or more of a confidence score output by the meeting summarization model or a similarity metric calculated based on embeddings of a corresponding candidate meeting summary and the corresponding set of chunks.

10. The computing device of claim 8, wherein generating the plurality of candidate meeting summaries comprises:

generating a first candidate meeting summary by providing a first chunk into the meeting summarization model;

generating a second candidate meeting summary by providing the first chunk and a second chunk into the meeting summary model; and generating a third candidate meeting summary by providing the one or more chunks into the meeting summary model.

11. The computing device of claim 8, wherein generating the second meeting summary based on the first portion and the second portion of the transcript comprises:

generating a second plurality of candidate meeting summaries by applying the meeting summarization model to subsets of chunks in the second portion of the transcript and one or more of the chunks in the first portion of the transcript that are not used in generating the selected candidate meeting summary.

12. The computing device of claim 8, wherein the second meeting summary comprises the first meeting summary and an additional meeting summary, and wherein:

generating the first meeting summary comprises applying the meeting summarization model to the first portion of the transcript;

generating the second meeting summary based on the first portion and the second portion of the transcript comprises applying the meeting summary model to a concatenation of the first portion of the transcript and the second portion of the transcript by forcing the meeting summary model to output the first meeting summary before the additional meeting summary in the second meeting summary is output; and presenting the second meeting summary in the user interface comprises presenting the additional meeting summary.

13. The computing device of claim 12, wherein the processor is configured to execute the processor-executable instructions stored in the non-transitory computer-readable medium to further:

receive a third portion of the transcript of the video conference;

generate a third meeting summary based on the second portion and the third portion of the transcript by applying the meeting summarization model to a concatenation of the second portion of the transcript and the third portion of the transcript by forcing the meeting summary model to output the second meeting summary before other meeting summary in the third meeting summary is output; and present the other meeting summary in the third meeting summary in the user interface.

14. A non-transitory computer-readable medium comprising processor-executable instructions configured to cause one or more processors to:

establish a video conference for a plurality of participants;

while the video conference is in progress, receive a first portion of a transcript of the video conference;

generate a first meeting summary based on the first portion of the transcript, comprising processor-executable instructions stored in the non-transitory computer-readable medium to cause the one or more processors to:

determine different sets of chunks based on the first portion of the transcript, each set of chunks comprising a different subset of one or more chunks of the first portion of the transcript, apply a meeting summarization model to the different sets of chunks to generate a plurality of candidate meeting summaries, and select a candidate meeting summary from the plurality of candidate meeting summaries that has a highest quality score as the first meeting summary;

cause the first meeting summary to be presented in a user interface accessible by a client computing device associated with at least one of the plurality of participants;

receive a second portion of the transcript of the video conference;

generate a second meeting summary based on the first portion and the second portion of the transcript; and cause the second meeting summary to be presented in the user interface.

15. The non-transitory computer-readable medium of claim 14, wherein a quality score comprises one or more of a confidence score output by the meeting summarization model or a similarity metric calculated based on embeddings of a corresponding candidate meeting summary and the corresponding set of chunks.

16. The non-transitory computer-readable medium of claim 14, wherein generating the plurality of candidate meeting summaries comprises:

generating a first candidate meeting summary by providing a first chunk into the meeting summarization model;

generating a second candidate meeting summary by providing the first chunk and a second chunk into the meeting summary model; and generating a third candidate meeting summary by providing the one or more chunks into the meeting summary model.

17. The non-transitory computer-readable medium of claim 14, wherein the second meeting summary comprises the first meeting summary and an additional meeting summary, and wherein:

generating the first meeting summary comprises applying the meeting summarization model to the first portion of the transcript;

generating the second meeting summary based on the first portion and the second portion of the transcript comprises applying the meeting summary model to a concatenation of the first portion of the transcript and the second portion of the transcript by forcing the meeting summary model to output the first meeting summary before the additional meeting summary in the second meeting summary is output; and presenting the second meeting summary in the user interface comprises presenting the additional meeting summary.

* * * * *